CRYOGENIC ELECTRONIC MEMORY UNIT

Original Filed Aug. 4, 1960

3 Sheets-Sheet 1

Inventors:
John W. Bremer,
Vernon L. Newhouse,
by Richard R. Brainard
Their Attorney.

CRYOGENIC ELECTRONIC MEMORY UNIT

Original Filed Aug. 4, 1960 3 Sheets-Sheet 2

Inventors:
John W. Bremer,
Vernon L. Newhouse,
by Richard R. Brainard
Their Attorney.

Inventors:
John W. Bremer,
Vernon L. Newhouse,
by Richard R. Brainard
Their Attorney.

United States Patent Office 3,271,592

Patented Sept. 6, 1966

3,271,592

CRYOGENIC ELECTRONIC MEMORY UNIT

John W. Bremer, Sunnyvale, Calif., and Vernon L. Newhouse, Scotia, N.Y., assignors to General Electric Company, a corporation of New York Original application Aug. 4, 1960, Ser. No. 47,539. Divided and this application Aug. 19, 1963, Ser. No. 311,272

2 Claims. (Cl. 307—88.5)

This application is a division of our application Serial No. 47,539, filed August 4, 1960, now abandoned, entitled "Cryogenic Electronic Memory Unit." This invention relates to cryogenic electronic memory devices and more particularly to such devices having improved input and output means contributing to the reduction in size of memory systems.

Certain electrical conductors are known to exhibit a loss of electrical resistance at super-cold temperatures approaching absolute zero and to regain this resistance in the presence of a specified magnetic field. A switching device employing this phenomenon may be constructed by surrounding a first such conductor with a coil formed of a conducting material, means being provided to maintain the device below the temperature at which resistance in the first conductor substantially disappears. A current is passed through the coil surrounding the first material and when this current is raised to a value sufficient to produce a "critical" magnetic field within the coil, the first conductor returns to a resistive or normal state. Therefore a switching action many be secured by passing a controlling current through the aforementioned coil to switch a current in the first conductor.

Since the controlled conductor exhibits the two distinctly different electrical states, i.e., the superconducting or non-resistive state and the resistive or normal state, it may be employed advantageously as a computer memory or logic element. Bistable circuits may be formed of such elements which are capable of assuming and retaining a certain path of current flow.

In conventional computing equipments, including those employing conventional cryogenic electronic devices, the memory portion of the computer has come to consume a considerable portion of the space allotted to the computer. Thus a memory unit for a general purpose digital computer may comprise several racks of equipment, being the largest single element of the computer. A reduction in the size of memory devices would allow a considerable reduction in computer size or alternatively an increase in the storage capacity available. An advantageous construction employed in the present invention is disclosed and claimed in our copending application Serial No. 758,474 filed September 2, 1958, now Patent No. 3,076,102, wherein a cryogenic electronic unit is formed from a first "gate" layer consisting of a metallic film deposited upon an insulating substrate with a second or "control grid" film layer deposited thereacross and insulated therefrom. A current of predetermined magnitude applied to the grid will cause a magnetic field to exist around the grid which field exceeds the critical field of the gate thereunder, thereby tending to force the gate into a resistive or normal condition. Current gain may be realized by use of a narrow thin grid since its narrowness allows the current in the grid necessary to establish a critical field to be less than the critical value of gate current, the field intensity around the narrow grid being stronger and therefore more effective. Devices of this type may be greatly miniaturized and tightly packed without altering their operation. For example, such a thin film cryogenic electronic device five millimeters in gate length and four millimeters in grid length may be arranged with approximately twenty thousand such devices per square foot on a flat plate substrate. The substrate plates may then be stacked with more than two such plates per centimeter or height thereby giving a capacity of over a million individual devices per cubic foot.

Even with such miniaturized devices, however, much valuable space is wasted by employing the individual memory units in conventional type circuitry, where, for example, a "flip-flop" bistable circuit comprises at least two such devices and wherein an "and" gate requires at least a similar number. Further complex circuitry is frequently employed for "writing in" to such devices used as memory units, and for retrieving the same information in a non-destructive manner.

It is accordingly an object of this invention to provide an improved cryogenic electronic memory device wherein an increased number of operations may be carried on in a given volume.

It is another object of this invention to provide an improved cryogenic electronic memory device requiring simpler apparatus and circuitry for writing in and withdrawing information therefrom non-destructively.

It is another object of this invention to provide a cryogenic electronic memory device having a retention of one digit per device with improved input and output means.

It is another object of this invention to provide an improved cryogenic electronic memory device capable of driving the input of another of such devices.

It is another object of this invention to provide an improved cryogenic electronic memory device combining the properties of memory retention and gating in one unit.

In accordance with the present invention a loop circuit capable of superconduction, deposited as a film upon an insulating substrate, is provided with a coupling means for injecting a current into at least a portion of the loop, an inhibiting grid lead across a portion of the loop for rendering normal at least a part thereof, and a superconducting output gate crossing the loop which gate may be rendered normal by currents crossing through the loop. The loop may be formed of a plurality of superconducting leads and gates in accordance with the particular properties desired. The material passing under the aforementioned grid lead is conventionally formed of a material having a lower critical field than the portion of the loop passing thereover. In this manner the gates may be rendered normal by the grid wires passing thereover without the said grid wires themselves becoming resistive by the action of their own magnetic fields.

According to another feature of the invention the coupling means is connected directly across the loop between the aforementioned grid and gate.

The subject matter which we regard as our invention is particularly pointed out and distinctly claimed in the concluding portion of this specification. The invention, however, both as to organization and method of operation, together with further objects and advantages thereof, may best be understood by reference to the following description taken in connection with the accompanying drawings in which:

Figures 1, 2:
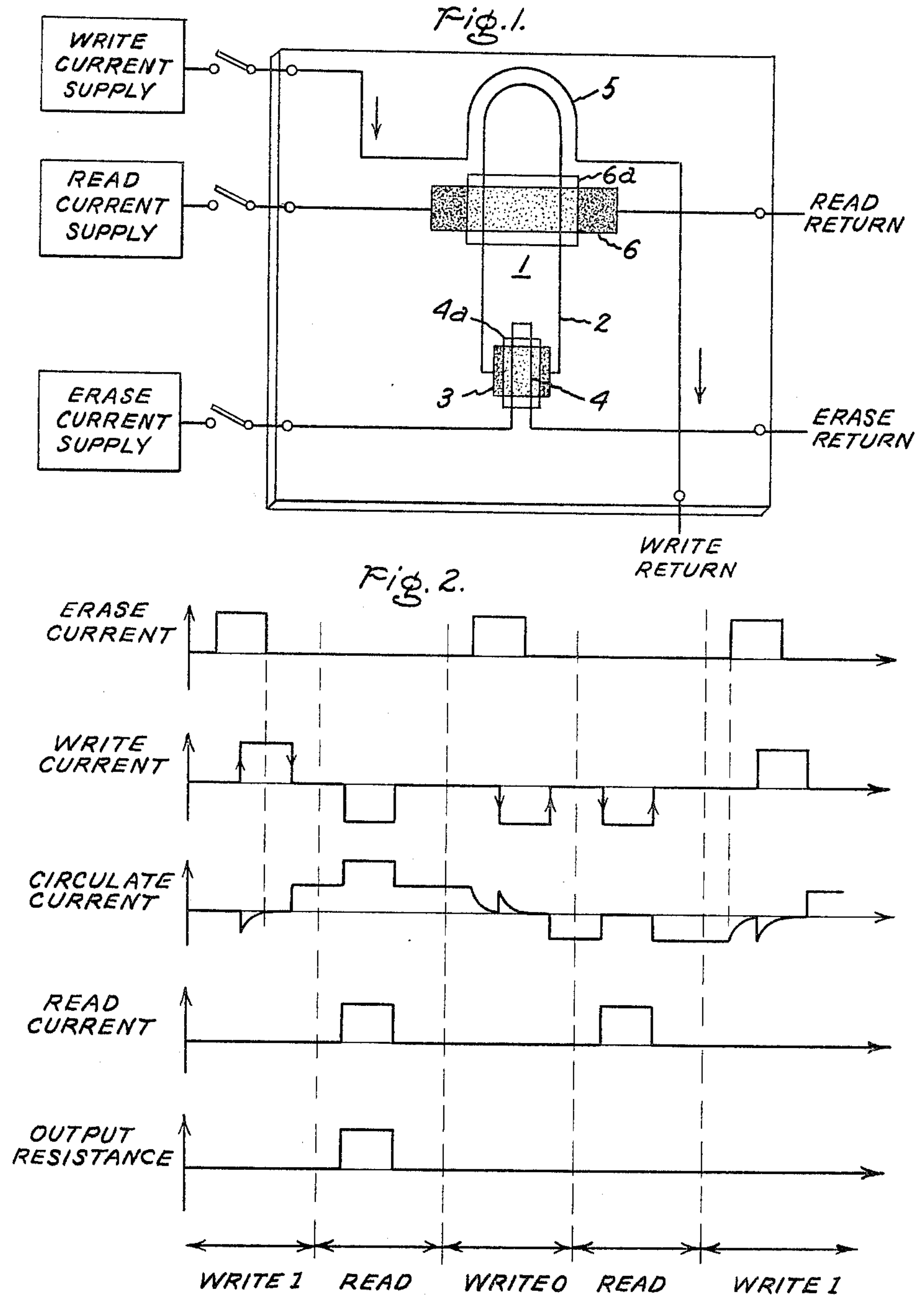
FIG. 1 is a schematic representation of a cryogenic electronic memory device according to the present invention.
FIG. 2 is a chart of wave forms illustrating the operation of the FIG. 1 device.

Referring to FIG. 1, a loop of material 1 capable of superconduction is serially formed of a conductor 2 of lead and a tin conductor 3 having a wider transverse dimension. The conductors forming this loop are preferably thin films of the type disclosed in our aforementioned copending application Serial No. 758,474 and are deposited on a common insulating substrate in the manner therein set forth. A narrow "erase" grid 4 (formed of lead) overlays tin gate 3 but is insulated electrically therefrom by insulation *4a* as also taught in the above application. A half loop 5 or "write" loop is placed over and insulated from conductor 2, so that it is inductively related to the loop including conductor 2 to obtain transformer action between half loop 5 and conductor 2. The top portion of conductor 2 overlays a tin "read" gate 6, being separated therefrom by insulation *6a*, and acts as a control grid similar to grid 4 with respect thereto.

The cryogenic electronic device of FIG. 1 is maintained, by means not illustrated, at a very low temperature, which, for presently known superconducting materials, is in the range of liquid helium or liquid hydrogen temperatures. This device may be submerged in liquid helium contained in a Dewar vessel that is surrounded by liquid nitrogen contained in a larger Dewar vessel. This low temperature apparatus is called a cryostat.

The respective grid and gates of the FIG. 1 device are constructed of different materials so that the critical or normalizing field strength for gate conductors is less than for associated grid conductors. At 3.5° K., a typical cryostat temperature, the transition fields for tin and lead are approximately 30 oersteds and 600 oersteds, respectively, attaining the desired differential in transition from the superconducting to the resistive state for these materials. It is understood that other materials having a similar differential in field criticality may be employed, or other means may be employed to insure the respective grids are capable of normalizing the gates over which they lie without themselves becoming resistive.

The operation of the FIG. 1 device is illustrated by the chart of waveforms shown in FIG. 2. They are, from top to bottom, as a function of time: the erase current in grid 4, the write current in loop 5, the circulating current in loop 1, the read current in tin gate 6, and the output resistance across the latter gate. A "one" stored is indicated by a clockwise current in circulating loop 1, and a "zero" stored is indicated by a counter-clockwise current in the same loop. The respective currents are preferably supplied from constant current generators.

A "one" is written initially when no current is circulating, first, by the application of an erase pulse, followed by a write pulse from the direction shown by the arrow. The write pulse induces a negative current (counterclockwise) in the circulating loop. The presence of this current and the erase current causes the tin gate 3 to be resistive, dissipating this induced current. When this current is entirely dissipated, the erase pulse is terminated. The write pulse is then terminated and this termination induces a positive current (clockwise) in the circulating loop 1. Since the entire loop is now superconducting, this current will continue to circulate with no decrease in amplitude and a "one" is stored.

The read cycle is initiated by simultaneous application of a negative write pulse and a read current pulse. The negative write pulse induces a positive pulse clockwise in loop 1 which adds to the current already present there. This makes the circulating current substantially double its previous value, and the currents are chosen such that this double current alone is sufficient to drive gate 6 into the resistive region. When the pulses are terminated the circulating current is reduced to its former value, leaving a "one" stored (and allowing tin gate 6 to return to a superconducting state).

To write a "zero" an erase pulse is applied and then a negative write pulse is applied. This induces a positive current in the circulating loop 1 but this quickly dissipates as the gate 3 is resistive. The write pulse is then terminated which induces a negative current in the circulating loop 1, and since the gate 3 is now superconducting, this current will continue to circulate indefinitely. A "zero" is now stored.

When a read cycle is now initiated, by applying a negative write pulse simultaneously with a read current pulse, a positive current is induced in the circulating loop 1. Since this induced current is approximately equal to but opposite to the circulating current already present due to the storage of the "zero," a net current of approximately zero now flows in the circulating loop 1. When the read pulse is applied, substantially no voltage appears across the tin gate 6 indicating no resistance therein. When the negative write pulse is terminated, the circulating current returns to its negative value due to induction between the two loops, leaving a stored "zero." In FIG. 2, the operation of write "one" is again shown, with a stored "zero" as the initial condition.

It is seen that a write cycle consists of an erase pulse followed by a write pulse—positive for storage of a "one" and negative for a storage of a "zero." The read cycle consists of a simultaneous read current pulse and a negative write current pulse. A large output resistance denotes a "one" stored, and a small resistance a "zero."

An alternative read cycle consists of the simultaneous application of a read current pulse and a positive write current pulse. This reduces the circulating current when a "one" is stored to nearly zero amplitude and increases the circulating current amplitude when a "zero" is stored to a large negative value. Since the polarity of the grid current across a gate is unimportant, a large output resistance will now occur in gate 6 when a "zero" is stored and a small resistance when a "one" is stored.

The cryogenic electronic memory device of the present invention operates both as a storage element and as an "and" gate for testing coincidence between a bit stored in the loop 1 and a subsequent interrogating write current pulse which may be applied simultaneously with the read current pulse during the read cycle. When the interrogation on the write wire coincides with the stored information (for example, if a "one" is stored and the interrogate gate pulse on the write line is positive) a small or no output resistance will be produced. If the sense of the interrogation pulse does not agree with the stored information, a large output resistance results. A utilization or indicating device for measuring the resistance of the output gate 6 is serially included in the read current lead to gate 6 with the source of read current pulses (not shown).

Figure 3:
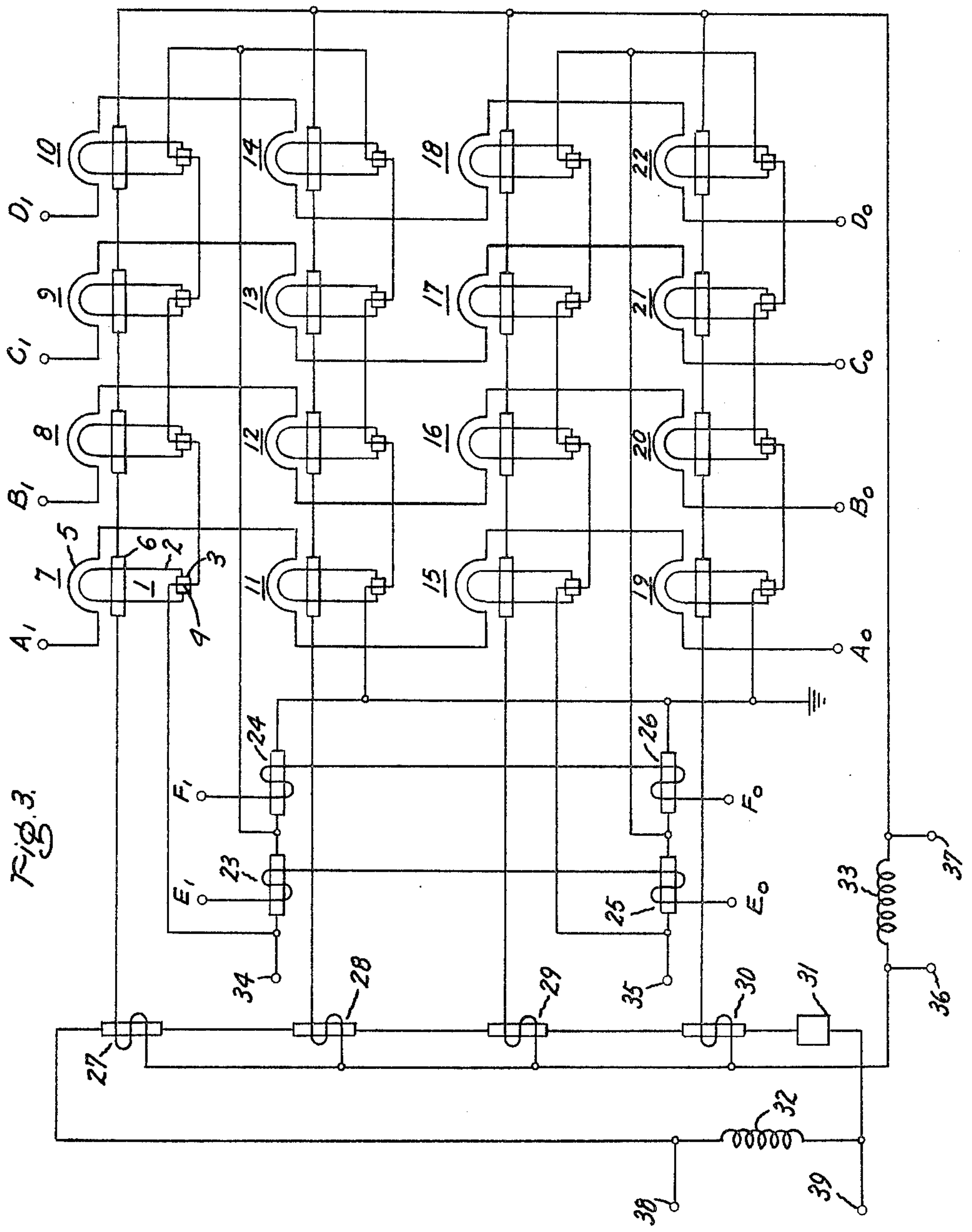
FIG. 3 is a schematic representation of a catalog memory device according to the present invention.

FIG. 3 illustrates a catalog memory system according to the present invention which employs the cryogenic electronic memory device. This memory system is set forth and claimed in our copending application Serial No. 47,539, filed August 4, 1960, and assigned to the assignee of the present invention.

A catalog memory device has important advantages in certain applications over conventional memory arrangements. In memory arrangements, the information is usually stored as binary digits, arranged in groups called words. In conventional memories, the stored information is extracted bit by bit or at best word by word. In a catalog memory, an interrogate word is selected, fed into the memory system, and may be compared at once with every word in the memory. If any word in the memory corresponds exactly to the interrogate word, an output signal is given. This type of operation is used, for example, in checking an order stock number against an inventory. If a conventional memory were to be used to this end, each stored word or bit would have to be interrogated separately by location and the desired comparison would have to be made by external logical circuitry.

The nature of operation of the catalog memory demands that each bit of information stored have associated with it a comparison circuit or "and" gate. The added cost introduced by this complexity has limited the use of catalog memories using vacuum tubes, transistors, magnetic devices, or even conventional cryogenic electronic devices. The scheme herein disclosed makes use of the combination information storage and gate functions of the cryogenic electronic storage devices according to the present invention. In FIG. 3, a 4 x 4 superconductive catalog memory is illustrated (4 words of 4 bits each), together with switching means for writing in and reading out information. Of course, a larger system could be built with any desired number of individual memory elements.

Cryogenic electronic memory devices 7 through 22, are arranged in columns and rows with devices 7 through 10 forming the top row and devices 7, 11, 15 and 19 forming the left-hand column. Second, third and fourth rows are placed under one another and are composed of units 11 through 14, 15 through 18, and 19 through 22, respectively. The entire unit is enclosed in an appropriate refrigeration device.

Units 7 through 10 have their output gates 6 serially interconnected and their erase grids 4 also serially interconnected. The same connections are made in rows 11 through 14, 15 through 18, and 19 through 22, respectively. The devices in a given column have their input coupling means 5 serially connected between respective terminals $A_1$–$A_0$, $B_1$–$B_0$, $C_1$–$C_0$ and $D_1$–$D_0$, designating the four digital positions A, B, C and D, of the stored and interrogated words.

A four position matrix composed of conventional cryogenic switches 23, 24, 25 and 26 is employed for selecting the row of the memory into which a word, A–B–C–D, is read. In this matrix the gate of switch 23 is connected in parallel across the buss serially joining the erase grids 4 of the top row of cryogenic electronic devices, that is devices 7 through 10 and the gates of switches 24, 25 and 26 are similarly arranged in parallel with succeeding rows of erase grids in the memory. The gates of cryogenic switches 23 and 24 are connected in series with terminal 34 to ground, the gates of devices 25 and 26 being similarly connected from terminal 35 to ground. The grids of devices 23 and 25 are serially interposed between terminals $E_1$ and $E_0$, while the grids of devices 24 and 26 are interposed between terminals $F_1$ and $F_0$. Currents used to operate these switches are selected in each instance so that a combination of grid current and gate current is required to return each superconducting gate to its normal or resistive state, whereby a selection of inputs may be employed to place resistance across tse erase grids 4 in one row of the memory matrix as hereinafter described.

Each of the serial circuits including the output gates 6 in a row of cryogenic memory devices also serially includes a grid of one of the cryogenic switches 27, 28 and 29 or 30 and then each such combination is paralleled with a superconducting dummy parallel inductance 33 having terminals 36 and 37 connected thereacross. The gates of cryogenic switches 27 through 30 form another series circuit with an output device 31, a superconducting dummy inductance 32 having terminals 38 and 39 being paralleled with the latter serial connection.

It should be noted that all interconnections employed within the memory are preferably superconducting at the operating temperature.

The operation of the FIG. 3 catalog memory matrix system is considered as follows: A current pulse is applied between either terminal 34 or 35 and ground and simultaneously therewith a current pulse is applied between $E_1$ and $E_0$ or $F_1$ and $F_0$. Assume, for example, that the latter is true in both cases. Then the unit 26 will become resistive and units 23, 24 and 25 will remain superconductive. The large resistance of unit 26 will allow the current applied at 35 to pass through the erase lines of units 22, 21, 20 and 19 before the current returns to ground. None of the other long erase lines will conduct much current inasmuch as these lines will be shunted in each case by the superconducting element of much lower inductance.

As a row is thus "selected" with matrix 23–26, the information to be stored in this row (units 19 through 22) is presented on write lines, A, B, C and D. If the "A" bit of the word to be stored is a "one," a positive current pulse is applied on line A1–A0 and so on. If a "zero" is to be stored, a negative pulse is inserted on a similar line. Referring to cryogenic electronic storage device 19, for example, the start of the "A" pulse will have no effect upon the storage loop 1 of the unit because of the simultaneous presence of an erase pulse in the same unit as hereinbefore described. However, the erase pulse is arranged to terminate before the end of the "A" pulse by discontinuing the inputs to the matrix 23–26 before the end of the "A" pulse. The conclusion of the "A" pulse induces a "one" in the storage loop of the device, consisting of a clockwise current which will continue to circulate after the "A" pulse is terminated, thereby storing the information. This "A" pulse will not have been stored in the loops of units 7, 11 or 15 inasmuch as no erase pulse was presented to these units and therefore the rise and fall of the "A" pulse had reverse effects on these units.

In the above manner an entire word may be written simultaneously in cryogenic electronic memory devices 19 through 22, the remaining bits thereof being inserted on the B, C and D lines. Other words are written similarly in the other rows. If desired, each of these units can be driven by individual erase lines, allowing individual bits to be written separately in the units.

The read lines of the matrix, that is the serial connections joining the read gates of each row, have been arranged in a parallel circuit having a total of five parallel branches, one of the branches being a dummy inductance 33. Now to interrogate the catalog memory, current pulses representing the bits of an interrogation word are presented at lines A1–A0, B1–B0, etc., and a read current pulse is presented between terminals 36 and 37. In any given storage unit, if the interrogation pulse is of the same polarity as the input bit pulse which caused the circulating current, the read gate 6 of that unit will remain at low resistance. If the interrogation pulse is of the opposite polarity, a large resistance appears at the read gate terminals. Thus, the parallel branch including the gates of a particular row for which complete agreement exists between the bits stored and the interrogation word will have a low resistance and the rest will have a high resistance, providing there is no other agreement. The bulk of the read current from terminals 36 and 37 will pass through that branch where there is agreement and also through the grid wire on one of the units 27 through 30. If, on the other hand, none of the stored words coincided with the interrogation word, the read current would then flow through the superconducting dummy inductance 33, rather than through any of the aforementioned grids. If a stored word coincided with the interrogation word, current will pass through one of the grid wires on units 27 through 30, which will cause one of these units to become resistive making the current from terminals 38 and 39 go through the inductance 32. Little current will then pass through the output device 31, thereby indicating agreement.

It should be noted that in the absence of any interrogation signal, on one of the A, B, C or D terminals, the output gate on corresponding cryogenic electronic memory devices remains non-resistive, since both a circulating current and an opposite interrogating current are required to make the output gate of a particular device go resistive. This provision is useful for interrogation of the memory with shortened words or parts of words. Thus if the catalog memory is interrogated with the shortened word "1–1," the lack of additional bits in the interrogation will not prevent an indication of coincidence. To state it another way, only a positive disagreement will cause output device 31 to be energized.

A refinement of the memory system can be accomplished by breaking up the catalog memory into blocks of words, each block with its own output gating arrangement for representing and indicating the particular location of the coinciding word in the memory.

Another refinement of the catalog memory system can be accomplished by observing in an analog fashion the resistance across the series string of read gates for a particular word—the lower the resistance, the more exact being the agreement with the interrogation word.

Although clockwise and counterclockwise currents are employed in the memory systems described it is understood that other codings may be arranged.

Figure 4:
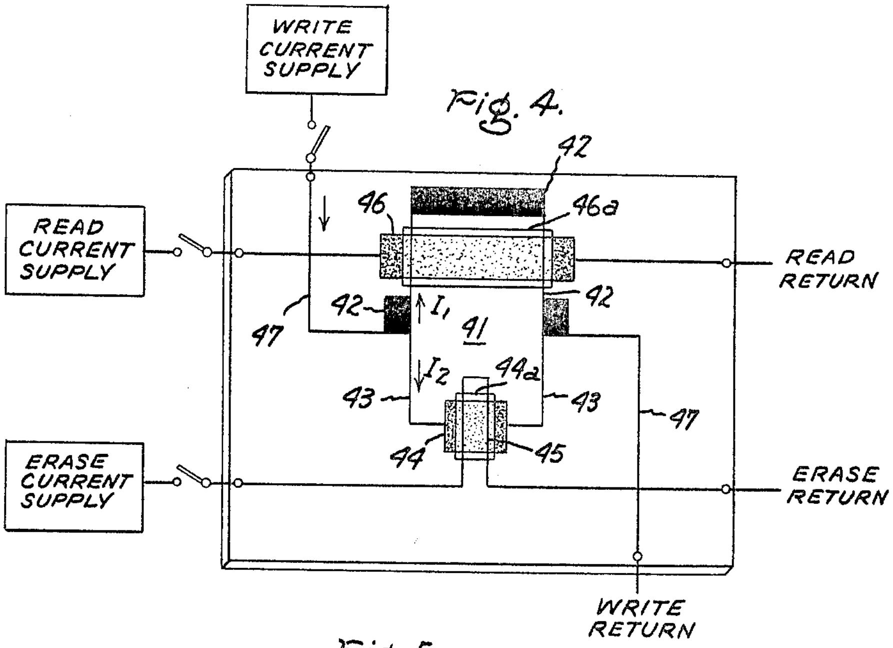
FIG. 4 is a schematic representation of a modification of the cryogenic electronic memory device according to the present invention.

A second cryogenic electronic memory device according to the present invention is illustrated in FIG. 4 which may, for example, be employed instead of the FIG. 1 device in the catalog matrix of FIG. 3. In this instance the input coupling to the storage loope is direct rather than inductive, allowing simplification of construction. Referring to the figure, a loop of superconducting material 41 includes conductors 42 and 43 formed of lead and a tin gate 44, all connected in series, the loop preferably being formed of deposited film conductors upon an insulating substrate. A lead "erase" grid superconductor 45 crosses gate 44, and is preferably deposited across gate 44 while being insulated therefrom by means of a suitable insulating layer 44*a*. An insulated "read" gate 46 underlies portions of conductor 42 so that conductor forms a grid thereover, insulated therefrom with insulation 46*a*, and input coupling or "write" leads 47 intersect the loop circuit between lead conductors 42 and 43. A superconducting shield plane layer may be formed above or below the device while insulated therefrom in order to increase operating speed.

The entire unit is operated at temperatures in the superconducting region for the tin and lead conductors employed, by means of suitable refrigeration apparatus. It is again understood that other superconductors could be used instead of tin and lead, so long as the grid conductors in each case are capable of rendering the underlying gate resistive or normal without at the same time adversely affecting their own superconductivity.

Read, write and erase current pulses are applied to the various connections of cryogenic electronic storage device and these currents are preferably derived from constant current generators. While a conventional voltage source may be employed to energize a superconducting circuit, a resistance must then be inserted between the source and the superconductor from dropping the source voltage, inasmuch as the superconductor in its superconducting state drops no voltage; but, even such a conventional source in series with a resistance may be thought of as a constant current source relative to the superconductor because the superconducting portion of the combined circuit does not determine the current flow.

In the FIG. 4 device if both branches were kept superconducting, and a write current were applied through leads 47, it is found that this current will initially divide through the two branches in inverse proportion to their respective inductances. This current ratio will continue even in the steady state or D.C. case after the initial current increase, because there is then no force present to change the current distribution, the voltage drop across both superconductors being zero. If the current supply is then removed, a reaction voltage appears across each of the two branches caused respectively by the collapse of the larger current in the smaller inductance and the smaller current in the larger inductance. The voltages across the two branches are equal and opposite with respect to one another and no loop current will flow.

If one branch is made initially resistive the entire current from the source will flow in the other branch and the first branch will have no initial current flowing therein. The first branch will then develop no reaction voltage at the conclusion of the current pulse and the reaction voltage across the other branch will be capable of forcing reverse current flow in the first branch, thus causing a persistent current to flow around the loop. It should be noted then, that in order to establish a persistent current in the loop, one branch thereof may be made resistive during introduction of current into the other branch, and then the first branch is allowed to become superconducting again before the outside source of current is disconnected. Upon termination of the outside current, a persistent loop current is established.

In the present device input coupling leads 47 intercept the loop between conductors 42 and 43, and are positioned to thereby divide the loop into two branches having nearly equal inductance. To this end, portions of deposited conductor 42 are widened, with the exception of the grid portion overlying the gate 46, for equalling the inductance of the branch comprising conductor 43 and relatively wide gate 44. Since the two branches then have equalized inductance, a current pulse applied through leads 47 will divide equally between the two branches, providing both are superconducting.

Figure 5:
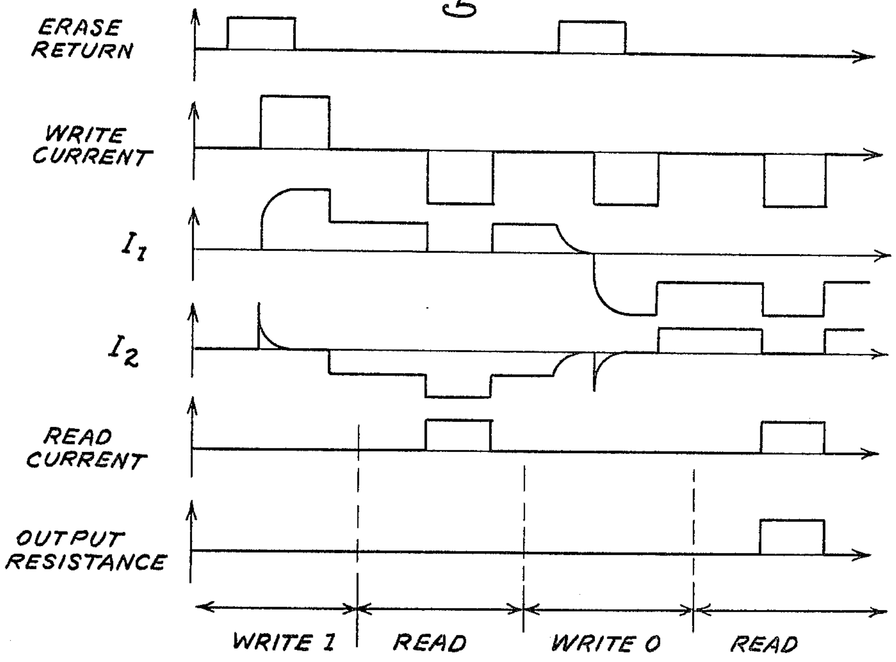
FIG. 5 is a chart of wave forms illustrating operation of the FIG. 4 device.

The actual operation of the FIG. 4 device is illustrated by the FIG. 5 chart of waveforms. The waveforms are from top to bottom, as functions of time: the erase current in the grid 45, the write current in input coupling leads 47, the current $I_1$ in conductors 42, across the thin film gate 46, the current $I_2$ in conductors 43 and thin film gate 44, the read current applied through gate 46, and the output resistance measured as a voltage across gate 46 in the presence of the read current. A "one" is indicated by a clockwise current in loop 41 (in the direction of $I_1$) and a "zero" is indicated by a counterclockwise current. A "one" is written initially when no current is circulating first by the application of an erase pulse followed by a positive write pulse in the direction shown by the arrow on the diagram. Inasmuch as the erase pulse renders the gate 44 resistive, the entire write current initially flows as $I_1$ through the conductor 42 thereby rendering gate 46 resistive. $I_2$ becomes zero since the superconductor 42 represents a substantial short circuit across the conductor 43 and furthermore the current $I_2$ remains zero at the conclusion of the erase pulse since essentially no voltage drop then exists along the conductor 42 to initiate a current $I_2$.

When the write pulse concludes, however, supercurrent $I_1$ will continue to flow and will follow a path through conductors 43 and gate 44 in a direction negative to $I_2$. $I_1$ drops to half due to the additional inductance initially encountered in the equal inductance branch including conductors 43 and gate 44. This persistent current, indicative of a stored "one," will continue to flow indefinitely until some outside influence, such as an erase current across grid 45, forces its conclusion.

The read cycle is initiated by the simultaneous application of a negative write pulse and a read current pulse. This write current pulse carried by leads 47 divides between conductors 42 and 43 in inverse proportion to the respective inductances of these branches, i.e., equally. The negative write current subtracts from the circulating current in conductor 42 so that substantially zero $I_1$ current remains therein. Therefore introduction of the read current drops zero voltage across gate 46 indicating its continued zero resistance condition.

The introduction of the next erase pulse renders gate 44 resistive and therefore terminates the persistent current in the loop 41. A zero is written in the loop 41 by first applying a negative write pulse to leads 47 before termination of the erase pulse. This entire write pulse eventually flows in conductors 42 inasmuch as a gate 44 is rendered resistive because of the continuing erase pulse in grid 45. At the conclusion of the erase pulse the entire negative write pulse will continue to flow in conductor 42 since no voltage drop then exists along conductor 42 which would cause a current to flow in conductor 43 and gate 44. However, at the conclusion of the negative write pulse, this negative $I_1$ current will persist and flow through conductors 43 and gate 44 in the direction shown by the $I_2$ arrow. This current will be half the previous value for $I_1$ because of the additional equal inductance encountered in the branch formed by conductors 43 and gate 44. Now, application of a negative write pulse will divide equally between the two superconductive branches, therefore adding to the negative $I_1$ flowing in conductor 42. This combined current is sufficient for rendering gate 46 resistive when a read current pulse is applied to gate 46 and therefore the read current pulse will drop a voltage across gate 46 indicative of resistance therein and therefore indicative of a stored zero.

It is noted that for the directions given for currents in the FIG. 4 device, the resistance and non-resistance conditions of the read gate are interchanged from those of the FIG. 1 device, so that agreement of write and interrogate pulses will cause resistance to exist in the read gate while disagreement will cause no resistance to exist in the read gate. Therefore the FIG. 3 matrix employing FIG. 4 devices will be responsive to coincidence with an interrogation which is the complete negative or complement of a stored signal. This apparent difficulty may be alleviated by interrogating with a negative or complement of the word sought in the memory. Alternatively, the read gates of a row in the memory may be arranged in a parallel read out matrix, arranged to give a coincidence indication only when all are resistive by diverting current into a dummy inductance cooperating with each such row. A superconductive "or" gate could then determine whether current was flowing through such a dummy inductance, for example, an "or" gate of the type comprising switches 27, 28, 29 and 30 in FIG. 3.

In the copending application of Vernon L. Newhouse, John W. Bremer and Harold H. Edwards, Serial No. 47,538, now Patent No. 3,123,720, there is disclosed and claimed a somewhat similar cryogenic electronic memory device to which the present invention is generic. In that device two branches of a superconducting loop are made to have unequal inductance so that an inserted current prefers a branch with the least inductance unless a grid placed thereacross renders this branch resistive, whereupon a circulating current may be forced to flow in the loop. A superconductive gate is positioned under a high inductance portion of the loop which may be rendered resistive by the circulating current flowing in the loop. A resistance encountered by a current flowing through the latter gate is indicative of a circulating current or bit stored in the loop while a lack of such resistance is indicative of no information stored in the loop. In distinction to the other cryogenic electronic devices disclosed herein a "one" is stored by a persistent current in the loop while a "zero" stored is indicated by a lack of such current. This cryogenic electronic device may be combined with other such devices according to one aspect of the invention disclosed and claimed in the copending application of Vernon L. Newhouse, John W. Bremer and Harold H. Edwards, Serial No. 47,538, to form a cryogenic shift register. In the shift register a plurality of cryogenic electronic memory devices of the type described have their persistent current loops consecutively coupled so that a persistent current in the first inhibits a persistent current in the second, and so on. A current is applied to a first loop comprising the pair of parallel branches having the low and high inductance. If the low inductance branch is not resistive, substantially all the current will flow in this branch and no persistent current will be caused to exist. However, if the low inductance branch is resistive, current will flow in the high inductance branch and when the first branch becomes superconductive and the current supply is removed, a persistent current will flow around the loop. One portion of the high inductance forms a grid over a gate portion of the low inductance branch of a second cryogenic electronic memory device, also having a high inductance branch in parallel therewith to form a complete loop. If current is flowing in the loop of the first cryogenic electronic memory device, a current supplied to the two branches of the second cryogenic electronic memory device will be diverted to the high inductance branch thereof inasmuch as the first branch is made resistive by the current flowing in the first device. Since the low inductance branch of the second loop is made initially resistive, a persistent current may be established in the loop of the second device, after the termination of the persistent current in the first device followed by a termination of the current supplied to the two branches of the second device. In this manner a stored "one" is transferred from the first device to the second, and may be similarly transferred along a chain of similarly intercoupled cryogenic electronic memory devices to form the shift register. Inasmuch as the cryogenic electronic devices consume a very small space, shift registers of considerable capacity may be easily accommodated.

Although a cryogenic electronic memory device of the present invention is useful in catalog memory systems and in serial shift registers, it will be appreciated that its application is not limited to those arrangements. The device may be advantageously employed as a unit in differential analyzers, pattern recognition computers, random access memories of various and complex configurations, and in general wherever other bit storages are indicated. Extremely compact memory organizations employing these devices may be advantageously substituted for magnetic drum, magnetic core or tape, transistor, or other conventional systems. The cryogenic electronic memory devices of the present invention may be vacuum deposited in mass to form large arrays of switching and storage elements together with interconnections, in a few steps. These devices are therefore cheaper and much more simply fabricated than existing conventional semi-conductor or magnetic devices.

As has been hereinbefore noted, the present device, in addition to performing a memory function, is additionally capable of performing gating or recognition functions without destroying the information stored and without requiring additional gate circuitry in the memory array.

The device of the present invention has an additional advantage of providing a current amplification thereacross, a feature which is useful in driving further such devices as, for example, in the aforementioned shift register, or for providing satisfactory output to utilization or indication portions of a computer.

While we have shown and described several embodiments of our invention, it will be apparent to those skilled in the art that many changes and modifications may be made without departing from our invention in its broader aspects; and we therefore intend the appended claims to cover all such changes and modifications as fall within the true spirit and scope of our invention.

What we claim as new and desire to secure by Letters Patent is:

1. A memory device comprising a loop circuit capable of superconduction, a second circuit coupled to said loop circuit for producing a persistent current in said loop circuit in one direction for one type of information and in the opposite direction for a second type of information, a conductor which is normally superconducting crossing said loop circuit, and means for providing a second current through said second circuit which increases the magnitude of the persistent current when the persistent current is in one direction and decreases the magnitude of the persistent current when the persistent current is in the opposite direction to render said conductor non-superconducting for said one direction of said persistent current so that the magnitude of the resistance of said conductor indicates the type of information stored in said loop circuit.

2. A memory device comprising a loop circuit capable of superconduction, a second circuit inductively related thereto for inducing a persistent current in said loop circuit in one direction for one type of information and in the opposite direction for a second type of information, a conductor crossing said loop circuit for inhibiting superconduction of said loop circuit, a second conductor also capable of superconduction crossing said loop circuit, means including said second circuit for inducing a second current in said loop circuit which increases the magnitude of the persistent current therein when said persistent current is in one direction and subtracts from the magnitude of the persistent current in said loop circuit when the current therein is in the opposite direction, the magnitude of the increased current being sufficient to render said second conductor non-superconducting, and means for providing a current through said second conductor to provide an output voltage thereacross when said conductor is not superconducting and corresponding to the increased magnitude of persistent current in said loop circuit, wherein said loop circuit, said second circuit, and said conductors comprise superposed deposited layers on a common substrate with insulating means insulating said layers from one another.

References Cited by the Examiner

UNITED STATES PATENTS

| | | | |
|---|---|---|---|
| 2,962,681 | 11/1960 | Lentz | 307—88.5 |
| 3,047,230 | 7/1962 | Anderson | 340—173.1 |
| 3,061,738 | 10/1962 | Wilson | 307—88.5 |
| 3,086,197 | 4/1963 | Anderson | 307—88.5 |
| 3,093,748 | 6/1963 | Anderson | 307—88.5 |

ARTHUR GAUSS, *Primary Examiner.*

J. ZAZWORSKY, *Assistant Examiner.*